Oct. 1, 1940.                G. LAKE                2,216,202
                           MINNOW BUCKET
                        Filed Aug. 4, 1938
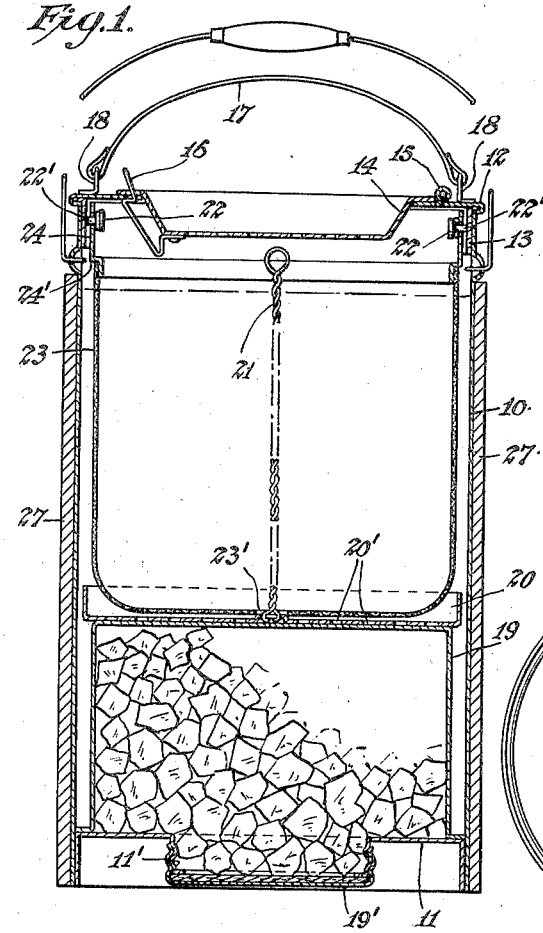
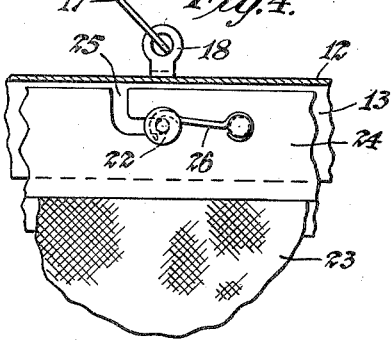
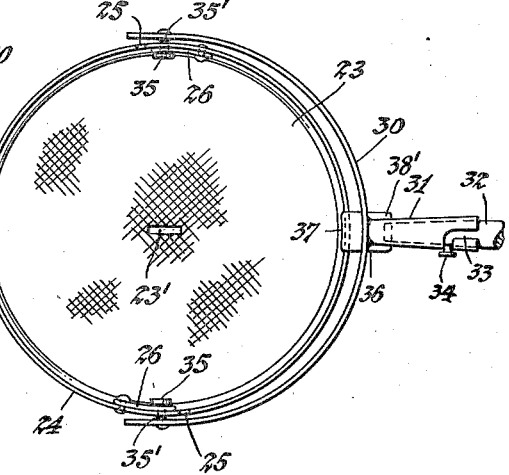
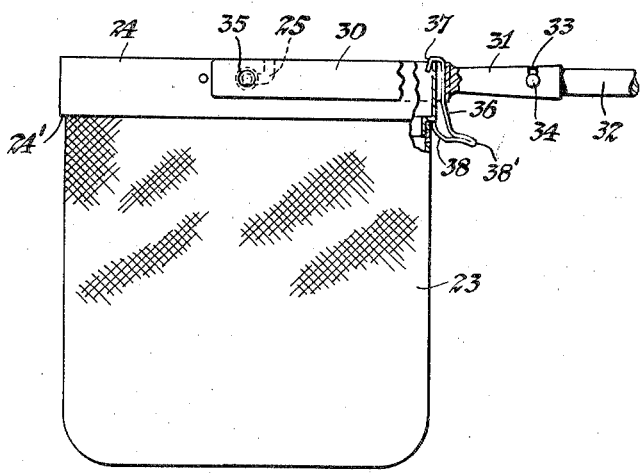
Golladay Lake
INVENTOR Patented Oct. 1, 1940

2,216,202

UNITED STATES PATENT OFFICE 2,216,202

MINNOW BUCKET

Golladay Lake, Grenada, Miss.

Application August 4, 1938, Serial No. 223,002

6 Claims. (Cl. 43—56)

This invention relates to minnow buckets such as are used by fishermen to hold live bait, and an object of the invention is to provide a bucket in which small bait fish will live longer and be livelier than in buckets commonly used. Another object is the provision of means for both aerating the water in the bucket, and for elevating the minnows so that they may be more readily captured for the baiting of fish hooks. A further object of the invention resides in a novel method of quickly converting an inner bucket into a landing net, particularly when an emergency arises where the use of such an implement is needed to facilitate the landing of a fish. Other objects will be apparent throughout the following specification.

The invention consists of a main cylindrical bucket provided with a loosely fitting cover having a lid hinged thereto. At the other end of the bucket there is provided a separate ice compartment which may be filled through an opening in the bottom sealed with a screw cap. A dasher or elevator rests on the top of the ice compartment by the use of which the water in the bucket may be aerated occasionally by agitating the dasher, or by which the bait, when in the main bucket, may be lifted into a more convenient position near the surface when it is desired to bait a hook.

The assembly includes a secondary or inner bucket which is detachably secured to the cover of the main bucket. This bucket may be used in the same manner as such inner buckets are ordinarily used, or withdrawn and used as a spare bucket by hanging overboard. It may also however be used in still another manner as it is detachably secured to the cover of the main bucket as shown in the embodiment illustrated in the drawing, by means of buttons cooperating with bayonet slots. By similar connections interchangeable therewith the forked frame of a long handle may be secured to the inner bucket and a convenient landing net may thus be improvised.

In the drawing forming a part of this specification:

Figure 1 is a vertical central section of a minnow bucket constructed in accordance with this invention, the handle of the main bucket being broken away.

Figure 2 is a side elevation, partly in section, of the inner bucket with handle attached to form a landing net.

Figure 3 is a top plan view of same, and,

Figure 4 is an enlarged fragmentary section of the upper portion of the inner bucket as viewed from the inside.

Referring more specifically to such drawing, there is provided a main cylindrical bucket 10 having a bottom 11 spaced upwardly from the lower edge of the walls of the main bucket. The top of the bucket is closed by a removable cover 12 having an annular flange 13 fitting snugly therein. A lid or door 14 is hinged at 15 to the cover 12, and is preferably formed with the top surface depressed and perforated in accordance with usual practice. A snap catch 16 is provided to hold the lid securely in place when closed.

The cover 12 is provided with a handle 17 with pivotal connection to lugs 18 soldered or otherwise secured to the cover 12.

Adjacent the lower end of the main bucket 10 there is provided an ice compartment 19 consisting of an inverted cup-shaped member the open lower end of which is flanged and soldered to the bottom 11. The latter has a central opening surrounded with a threaded collar 11' adapted to receive a screw cap 19' provided with the usual gasket to effect a seal against leakage. The compartment 19 may be filled with cracked ice by inverting the bucket and removing the screw cap, after which the cap 19' may be tightly applied and the bucket righted and filled with water to the desired level as indicated in Figure 1 with the broken line near the top of the bucket.

The bottom, or in this position, the top wall of the ice compartment is flat so that a dasher 20 may rest on same. The latter consists of a shallow cylindrical tray provided with a central upwardly extending handle 21, which may be constructed from twisted strands of wire as shown, terminating at the top in a loop to be grasped by the fingers. At its lower end the handle 21 is secured to a struck up portion of the tray in the center thereof, and the ends of the wire may be passed through holes in same, clinched and soldered to make secure and firm. The bottom of the dasher 20 is perforated with a series of small holes 20' so that when the handle is grasped and the dasher rapidly raised and lowered a number of times, the water will be churned through the holes 20' and thoroughly aerated, as occasion requires, and thus rendered more life sustaining to the small bait fish, as will be readily understood.

The cover 12 is provided with two inwardly projecting headed buttons 22 which are secured to same by riveting or soldering to the flange 13 in diametrically opposed positions.

An inner or spare bucket 23 is provided, preferably of wire mesh or light perforated metal. It is also cylindrical and has a slot 23' in the bottom so that it may be assembled within the main bucket with the handle 21 of the dasher 20 extending through the slot 23'. The bucket 23 has a top annular rim 24 offset at its lower edge to form an annular shoulder 24' and with a depending flange to which latter may be secured, as by soldering, the wire mesh of the main body of the bucket. Bayonet slots 25 are formed in diametrically opposite sides of rim 24 opening upwardly through the top edge of the rim 24, and which are adapted to receive the buttons 22 of the cover 12.

It will be apparent that cover 12 and bucket 23 may be securely connected by passing the shanks 22' of buttons 22 downwardly into the open end of slots 25, and then when either element is given a slight turn the shanks will be locked firmly in position in a well known manner. If desired hooks 26 may be provided by pivoting same to rim 24, and when in the position shown in Figure 4 will positively prevent any relative turning of the bucket 23 or cover 12 to free the buttons from slots 25. Thus bucket 23 may now be lifted out of the main bucket 10 by handle 17 and suspended overboard from a boat, or immersed in shallow water at the edge of a pond or stream, to serve as a spare bucket in which to keep live bait.

The main bucket 10 may now be used concurrently for live bait, the dasher obviating the necessity of frequently changing the water, and the ice compartment maintaining a cool temperature within the bucket. To conserve lowered water temperatures the main bucket may be insulated as shown at 27.

Means are provided for converting the inner bucket 23 into a landing net, consisting in this instance of a forked frame 30 from which projects a hollow socket 31 centrally thereof, adapted to receive a handle 32 preferably made up of short lengths with telescoping joints. Socket 31 may be provided with means for removably securing the handle 32 therein such as a bayonet slot 33 adapted to receive a button 34 secured to the handle 32, so that the latter be locked in the socket by a twisting movement. Adjacent the ends of the forks of frame 30 are secured buttons 35 which are similar to buttons 22 of cover 12 their shanks extending radially inwardly with respect to rim 24, when in assembled relation thereto.

Secured to the inner surface of the frame 30 opposite socket 31 there is provided a spring clamp 36 having a hook 37 at the top and a latch 38 oppositely disposed below same, and bent outwardly as shown in Figure 3 to form a finger piece 38' for releasing the clamp when desired to disconnect the handle.

To attach frame 30 to the rim 24 of the inner bucket 23, the shanks 35' of buttons 35 are first inserted in the open ends of the slots 25 with the frame tilted upwardly at an angle to the plane of the top of the rim. The frame is then turned sufficiently to seat the shanks in the horizontal portions of the slots 25 which it will be understood extend around rim 24 in opposed relation. Hooks 26 may then be dropped over the shanks of the buttons to prevent any further rotation of the frame 30 in a return or releasing direction. It is now only necessary to lower frame 30 until the hook 37 engages the top edge of rim 24 and latch 38 snaps into place beneath shoulder 24'. In this manner frame 30 becomes firmly attached to bucket 23, and to remove same it is only necessary to lift portion 38' to withdraw latch 38, following which procedure the frame 30 may be swung upwardly and rotated, after lifting hooks 26, so that buttons 35 will be free to leave slots 25.

The foregoing description is merely illustrative and not intended as limiting the invention thereto. Various modifications, which are merely matters of form of design, may be made within the scope of the claims without departing from the spirit of the invention.

I claim:

1. In a minnow bucket a main water bucket and a removable cover for same having a lid hinged thereto, an inner bucket secured to said cover, and a dasher loosely supported within said main bucket below the inner bucket, and provided with an upwardly extending handle for oscillating the dasher to aerate the water.

2. In a minnow bucket a main water bucket and a removable cover for same having a lid hinged thereto, a separate ice compartment adjacent the bottom of the main bucket including a closure element, an inner bucket detachably secured to said cover, a dasher loosely supported within said main bucket above said ice compartment, and provided with a handle for oscillating the dasher to aerate the water when said inner bucket is raised, or for lifting the dasher to elevate the minnows in said water when the inner bucket is not used in the assembly.

3. In a minnow bucket a main water bucket and a removable cover for same having a lid hinged thereto, a separate ice compartment adjacent the bottom of the main bucket including a closure element, an inner bucket suspended from said cover, a dasher loosely supported within said main bucket above said ice compartment, and provided with a handle for oscillating the dasher or for lifting it, said dasher being positioned beneath the inner bucket, and the said handle extending upwardly through the bottom of same.

4. In a minnow bucket the combination of a main water bucket, a cover for same, an inner bucket suspended from said cover within said main bucket, a dasher beneath said inner bucket having a handle extending upwardly through the bottom of the inner bucket, and a separate ice compartment beneath the dasher forming the bottom of said main bucket, and having an opening therein and closure for same.

5. In a minnow bucket the combination of a main water bucket, a cover for same, an inner bucket suspended from said cover within said main bucket, a dasher beneath said inner bucket having a handle extending upwardly through the bottom of the inner bucket, and a separate ice compartment beneath the dasher.

6. In a minnow bucket a main water bucket and a removable cover for same having a lid hinged thereto, an inner bucket secured to said cover, and a dasher loosely supported within said main bucket below the inner bucket, and provided with a handle for oscillating the dasher to aerate the water, said handle extending upwardly through the bottom of the inner bucket.

GOLLADAY LAKE.